US012770809B2

(12) United States Patent
Valcher et al.

(10) Patent No.: US 12,770,809 B2
(45) Date of Patent: Oct. 20, 2026

(54) DOUBLE POLE DOUBLE THROW SWITCH

(71) Applicant: C&K COMPONENTS S.A.S., Dole (FR)

(72) Inventors: Fabrice Valcher, Rouvres-en-Plaine (FR); Laurent Bouvier, Monnieres (FR); Robin Denat, Chicago, IL (US)

(73) Assignee: C&K Components S.A.S., Dole (FR)

( * ) Notice: Subject to any disclaimer, the term of this patent is extended or adjusted under 35 U.S.C. 154(b) by 286 days.

(21) Appl. No.: 18/640,105

(22) Filed: Apr. 19, 2024

(65) Prior Publication Data

US 2025/0329505 A1 Oct. 23, 2025

(51) Int. Cl.
*H01H 13/14* (2006.01)
*H01H 13/28* (2006.01)

(52) U.S. Cl.
CPC ............ *H01H 13/14* (2013.01); *H01H 13/28* (2013.01)

(58) Field of Classification Search
CPC ........... H01H 2003/00; H01H 2003/08; H01H 2003/12; H01H 2215/00; H01H 2215/004; H01H 2215/06; H01H 2215/018; H01H 2227/022; H01H 2237/00; H01H 2237/004; H01H 1/58; H01H 9/16; H01H 9/161; H01H 2225/008; H01H 2001/58; H01H 2001/5822; H01H 3/02; H01H 3/04; H01H 3/12; H01H 13/00; H01H 13/02; H01H 13/023; H01H 13/10; H01H 13/12; H01H 13/14; H01H 13/28; H01H 13/20; H01H 13/22; H01H 13/48; H01H 13/50; H01H 13/52; H01H 13/66
USPC .......................................................... 200/402
See application file for complete search history.

(56) References Cited

U.S. PATENT DOCUMENTS

| | | | |
|---|---|---|---|
| 3,491,218 A | 1/1970 | Robbins | |
| 4,803,316 A | 2/1989 | Hayashi et al. | |
| 4,996,401 A * | 2/1991 | Park | H01H 13/585 200/527 |
| 8,115,131 B2 | 2/2012 | Domzalski | |
| 2010/0025205 A1 * | 2/2010 | Domzalski | H01H 13/30 200/1 B |

OTHER PUBLICATIONS

European Search Report for EP Application No. 25169635.7, dated Aug. 12, 2025, 6 pages.

* cited by examiner

*Primary Examiner* — Anthony R Jimenez
(74) *Attorney, Agent, or Firm* — KDW Firm, PLLC

(57) ABSTRACT

A double pole double throw switch including a housing containing a tactile dome disposed over movable input contacts, and an actuator disposed over the tactile dome and adapted to be engaged by a user. When the actuator is not engaged, the movable input contacts engage fixed open circuit output contacts within the housing, creating a path for electrical current to flow from the movable input contacts to open circuit output conductors extending out of the housing. When the actuator is engaged, the actuator presses on the tactile dome, causing the tactile dome to deflect, which in-turn causes the movable input contacts to move out of engagement with the fixed open circuit output contacts and into engagement with closed circuit output contact terminals within the housing, creating a path for electrical current to flow from the movable input contacts to closed circuit output conductors extending out of the housing.

20 Claims, 8 Drawing Sheets

DOUBLE POLE DOUBLE THROW SWITCH

FIELD OF THE DISCLOSURE

The present disclosure relates generally to the field of switches and relates more particularly to a double pole double throw switch that provides state verification.

FIELD OF THE DISCLOSURE

Tactile switches and snap switches, also known as momentary push-button switches, are ubiquitous in modern electronic devices, serving as essential components in user interfaces across various industries. These switches provide palpable, tactile feedback to users upon actuation, indicating successful input recognition. Conventionally, tactile switches and snap switches have normal, non-actuated positions that correspond to either an open circuit state or a closed circuit state. When the switch is actuated (e.g., pressed by a user), the switch moves from its non-actuated position to an actuated position, which changes the state of the circuit from open to closed or vice versa. When the switch is released, the switch automatically moves back to its non-actuated position, which changes the state of the circuit back from a closed to open or vice versa.

While the physical state of the actuation mechanism (e.g., push button) of a tactile switch or a snap switch switch is readily apparent, it would be desirable to provide positive, definite verification of the state of the corresponding electrical circuit to ensure that the electrical circuit is in-fact open when the switch is not actuated and closed when the switch is actuated (or vice versa).

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An embodiment of a double pole double throw (DPDT) switch in accordance with the present disclosure may include a housing defining an internal cavity, first and second input conductors extending through a first sidewall of the housing and terminating in respective first and second input contact terminals within the internal cavity, first and second open circuit output conductors extending through a second sidewall of the housing and terminating in respective first and second open circuit output contact terminals within the internal cavity, first and second closed circuit output conductors extending through the second sidewall and terminating in respective first and second closed circuit output contact terminals within the internal cavity, first and second movable input contacts connected to the first and second input contact terminals, respectively, extending through the internal cavity and terminating in respective first and second free ends disposed over the first and second closed circuit output contact terminals, first and second fixed open circuit output contacts connected to the first and second open circuit output contact terminals, respectively, and defining respective first and second pads that extend over the first and second free ends of the first and second movable input contacts, respectively, a bascule element pivotably mounted within the internal cavity and having a cantilevered portion extending over the first and second free ends of the first and second movable input contacts, a tactile dome disposed within the internal cavity and extending over the bascule element, and an actuator disposed atop the housing and over the tactile dome and adapted to be engaged by a user, wherein, when the actuator is not engaged and the DPDT switch is in a non-actuated state, the first and second free ends of the first and second movable input contacts are in contact with the first and second pads of the first and second fixed open circuit output contacts, respectively, creating a path for electrical current to flow from the first and second input conductors to the first and second open circuit output conductors, and wherein, when the actuator is engaged and the DPDT switch is in an actuated state, the actuator presses on the tactile dome, causing the tactile dome to deflect and press on the bascule, causing the bascule element to press on the first and second free ends of the first and second movable input contacts, moving the first and second free ends out of contact with the first and second pads of the first and second fixed open circuit output contacts and into contact with the first and second closed circuit output contact terminals, respectively, creating a path for electrical current to flow from the first and second input conductors to the first and second closed circuit output conductors.

An embodiment of a double pole double throw (DPDT) tactile switch in accordance with the present disclosure may include a housing defining an internal cavity, first and second input conductors extending through a first sidewall of the housing and terminating in respective first and second input contact terminals within the internal cavity, first and second open circuit output conductors extending through a second sidewall of the housing and terminating in respective first and second open circuit output contact terminals within the internal cavity, first and second closed circuit output conductors extending through the second sidewall and terminating in respective first and second closed circuit output contact terminals within the internal cavity, first and second movable input contacts connected to the first and second input contact terminals, respectively, extending through the internal cavity and terminating in respective first and second free ends disposed over the first and second closed circuit output contact terminals, first and second fixed open circuit output contacts connected to the first and second open circuit output contact terminals, respectively, and defining respective first and second pads that extend over the first and second free ends of the first and second movable input contacts, respectively, a bascule element pivotably mounted within the internal cavity and having a cantilevered portion extending over the first and second free ends of the first and second movable input contacts, a tactile dome disposed within the internal cavity and extending over the bascule element, and an flexible actuator disposed atop the housing and over the tactile dome, wherein the flexible actuator is formed of an elastic material and comprises an upwardly extending button adapted to be manually engaged by a user, and a plunger extending downwardly from an underside of the button, wherein a bottom surface of the plunger is disposed directly above the tactile dome, wherein the button is adapted to be depressed in response to application of a manual force and to automatically return to an undepressed position when the manual force is removed, wherein, when the button is not depressed and the DPDT tactile switch is in a non-actuated state, the first and second free ends of the first and second movable input contacts are in contact with the first and second pads of the first and second fixed open circuit output contacts, respectively, creating a path for electrical current to flow from the first and second input conductors to the first and second open circuit output conductors, and wherein, when the button is depressed and the DPDT tactile switch is in an actuated state, the plunger of the flexible actuator presses on the tactile dome, causing the tactile dome to deflect and press on the bascule, causing the bascule element to press on the first and second free ends of the first and second movable input contacts, moving the first and second free ends out of contact with the first and second pads of the first and second fixed open circuit output contacts and into contact with the first and second closed circuit output contact terminals, respectively, creating a path for electrical current to flow from the first and second input conductors to the first and second closed circuit output conductors.

An embodiment of a double pole double throw (DPDT) snap switch in accordance with the present disclosure may include a housing defining an internal cavity, first and second input conductors extending through a first sidewall of the housing and terminating in respective first and second input contact terminals within the internal cavity, first and second open circuit output conductors extending through a second sidewall of the housing and terminating in respective first and second open circuit output contact terminals within the internal cavity, first and second closed circuit output conductors extending through the second sidewall and terminating in respective first and second closed circuit output contact terminals within the internal cavity, first and second movable input contacts connected to the first and second input contact terminals, respectively, extending through the internal cavity and terminating in respective first and second free ends disposed over the first and second closed circuit output contact terminals, first and second fixed open circuit output contacts connected to the first and second open circuit output contact terminals, respectively, and defining respective first and second pads that extend over the first and second free ends of the first and second movable input contacts, respectively, a bascule element pivotably mounted within the internal cavity and having a cantilevered portion extending over the first and second free ends of the first and second movable input contacts, a tactile dome disposed within the internal cavity and extending over the bascule element, a spring-loaded actuator disposed atop the housing and over the tactile dome, the spring-loaded actuator comprising a plunger located above the tactile dome, and a coil spring disposed atop the tactile dome and extending into a cavity formed in a bottom of the plunger. The (DPDT) snap switch may further include a housing cap disposed atop the housing and having an aperture through which the plunger extends, and a sealing boot disposed atop the housing cover, over the plunger, with a tip of the plunger extending through an aperture in a top of the sealing boot and defining a button adapted to be manually engaged by a user, wherein, when the button is not engaged and the DPDT snap switch is in a non-actuated state, the first and second free ends of the first and second movable input contacts are in contact with the first and second pads of the first and second fixed open circuit output contacts, respectively, creating a path for electrical current to flow from the first and second input conductors to the first and second open circuit output conductors, and wherein, when the button is engaged and the DPDT snap switch is in an actuated state, the coil spring of the spring-loaded actuator is compressed between the plunger and the tactile dome, causing the tactile dome to deflect and press on the bascule, causing the bascule element to press on the first and second free ends of the first and second movable input contacts, moving the first and second free ends out of contact with the first and second pads of the first and second fixed open circuit output contacts and into contact with the first and second closed circuit output contact terminals, respectively, creating a path for electrical current to flow from the first and second input conductors to the first and second closed circuit output conductors.

Figure 1A:
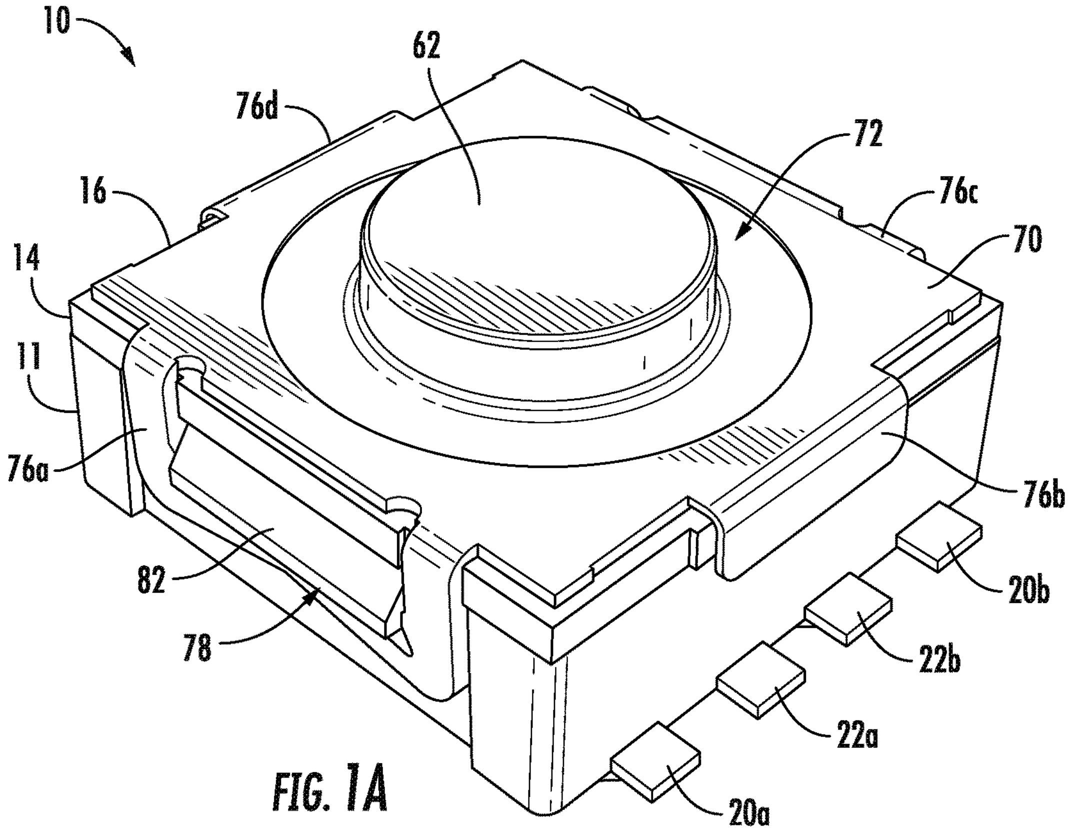
FIG. 1A is a top perspective view illustrating a tactile switch in accordance with an embodiment of the present disclosure.

The drawings are not necessarily to scale. The drawings are merely representations, not intended to portray specific parameters of the disclosure. The drawings are intended to depict example embodiments of the disclosure, and thus are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Embodiments of a double pole double throw (DPDT) switch in accordance with the present disclosure will now be described more fully hereinafter with reference to the accompanying drawings. The DPDT switch may be embodied in many different forms and is not to be construed as being limited to the embodiments set forth herein. These embodiments are provided so that this disclosure will be thorough and complete, and will fully convey the scope of the DPDT switch to those skilled in the art. In the drawings, like numbers refer to like elements throughout unless otherwise noted.

Figure 1B:
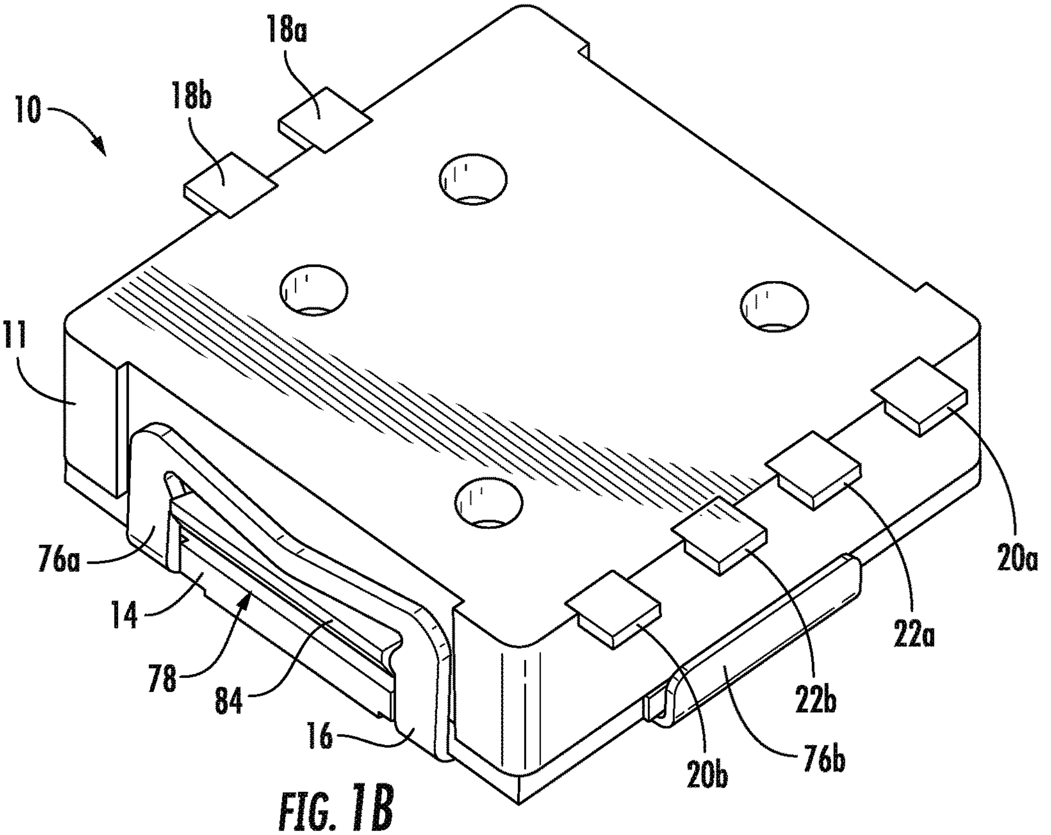
FIG. 1B is a bottom perspective view illustrating the tactile switch of FIG. 1A.
Figure 1C:
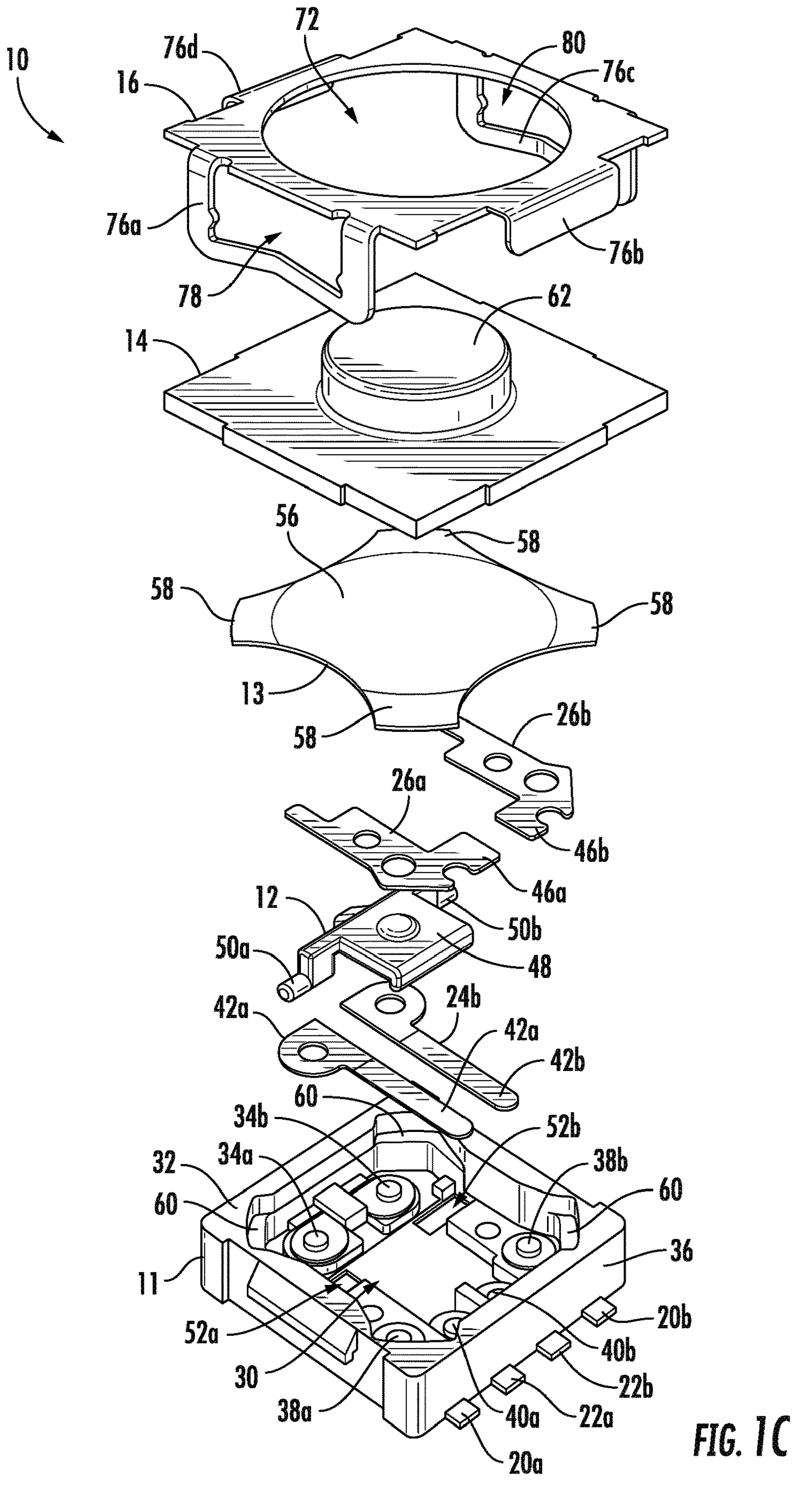
FIG. 1C is an exploded view illustrating the tactile switch of FIG. 1A.

Referring to FIGS. 1A-1C, a top perspective view, a bottom perspective view, and an exploded view illustrating a DPDT throw tactile switch 10 (hereinafter "the tactile switch 10") in accordance with an embodiment of the present disclosure are provided, respectively. For the sake of convenience and clarity, terms such as "top," "bottom," "up," "down," "upper," "lower," "above," "below," "vertical," "lateral," and "horizontal," and the like may be used herein to describe the relative positions and orientations of various components of the tactile switch 10, all with respect to the geometry and orientation of the tactile switch 10 as it appears in FIGS. 1A-1C. Said terminology will include the words specifically mentioned, derivatives thereof, and words of similar import.

The tactile switch 10 may generally include a housing 11, a bascule element 12, a tactile dome 13, a flexible actuator 14, and a fastening frame 16 disposed in a stacked arrangement in the aforementioned order as further described below. The tactile switch 10 may further include a number of current carrying elements, including first and second input conductors 18*a*, 18*b*, first and second open circuit output conductors 20*a*, 20*b*, first and second closed circuit output conductors 22*a*, 22*b*, first and second movable input contacts 24*a*, 24*b*, and first and second fixed open circuit output contacts 26*a*, 26*b* disposed at least partially within the housing 11 as further described below.

The housing 11 may be formed of a dielectric material (e.g., plastic, ceramic, etc.) and may define an internal cavity 30. The first and second input conductors 18*a*, 18*b* may extend through a first sidewall 32 of the housing 11 and may terminate in respective first and second input contact terminals 34*a*, 34*b* disposed within the housing 11. The first and second open circuit output conductors 20*a*, 20*b* may extend through a second sidewall 36 of the housing 11 opposite the first sidewall 32 and may terminate in respective first and second open circuit output contact terminals 38*a*, 38*b* disposed within the housing 11. The first and second closed circuit output conductors 22*a*, 22*b* may extend through the second sidewall 36 and may terminate in respective first and second closed circuit output contact terminals 40*a*, 40*b* disposed within the housing 11. In various embodiments, the aforementioned current carrying elements may be formed of any suitable electrically conductive material, including, but not limited to, copper, gold, aluminum, silver, etc., and the housing 11 may be overmolded onto the aforementioned input and output conductors. The present disclosure is not limited in this regard.

Figure 2:
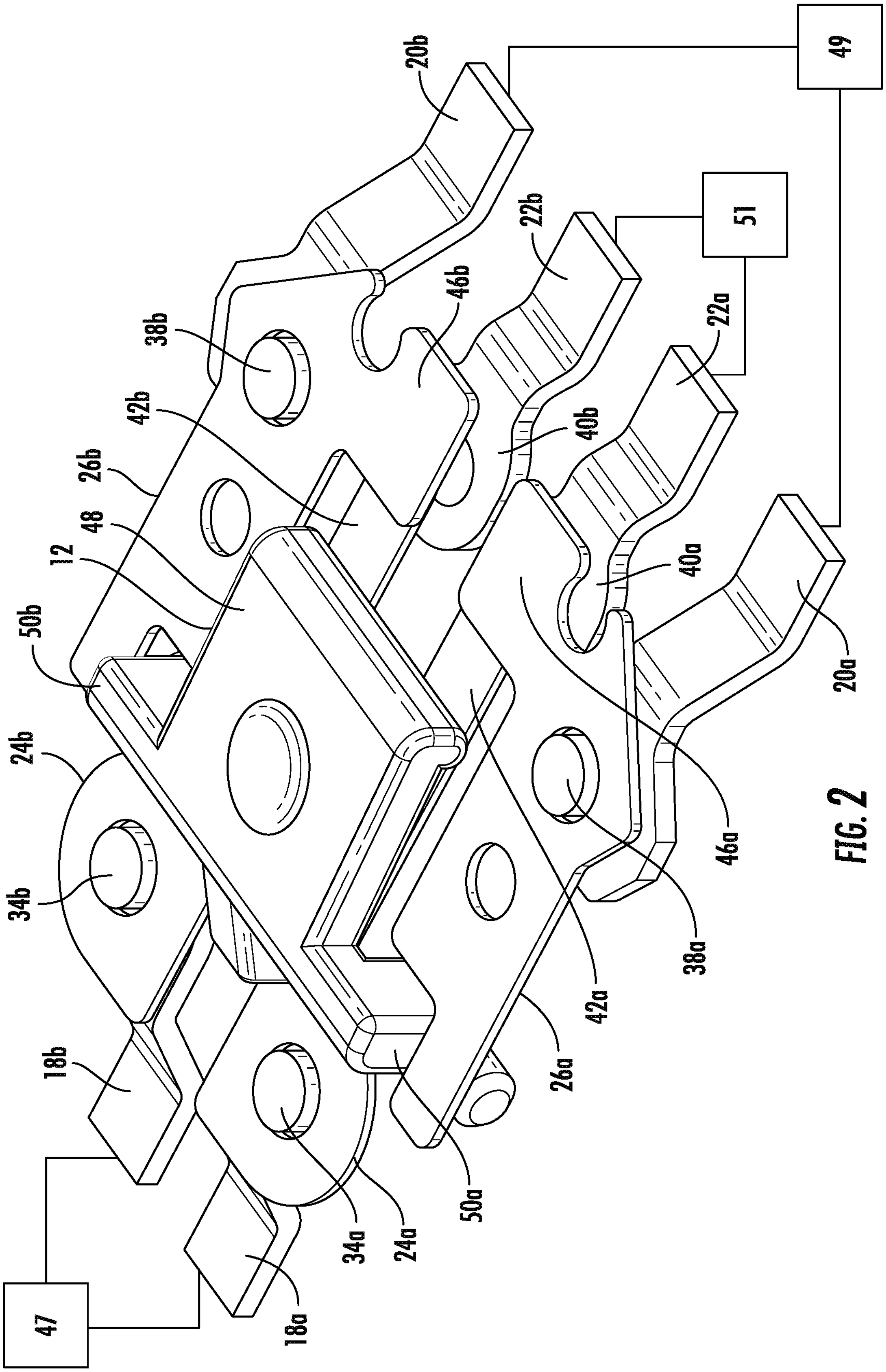
FIG. 2 is a detail view illustrating a bascule element and current carrying elements of the tactile switch of FIG. 1A.

Referring to FIG. 2, a perspective view illustrating the arrangement of the current carrying elements and the bascule element 12 of the tactile switch 10 is provided. The remaining components of the tactile switch 10 are omitted from FIG. 2 for clarity. The first and second movable input contacts 24*a*, 24*b* may be generally planar strips or plates of electrically conductive material that are mechanically and electrically connected to the first and second input contact terminals 34*a*, 34*b*, respectively, such as via crimping, welding, soldering, etc. The first and second movable input contacts 24*a*, 24*b* may extend horizontally through the housing 11 (see FIG. 1C) and may terminate in respective first and second free ends 42*a*, 42*b* that are disposed over, but not in contact with, the first and second closed circuit output contact terminals 40*a*, 40*b*, respectively.

Figure 3A:
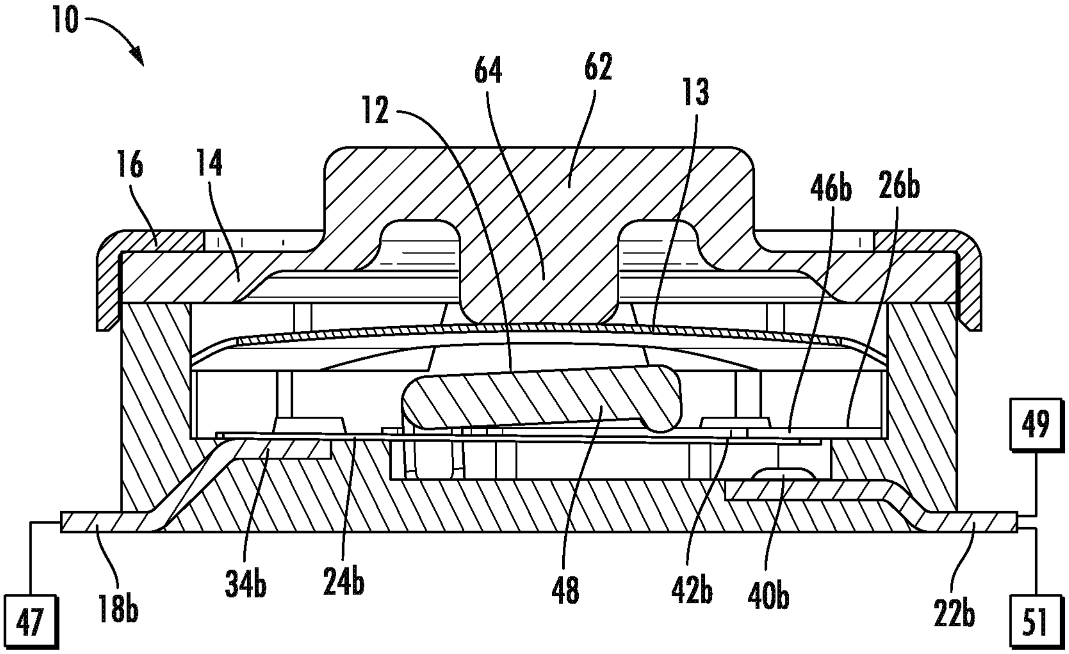
FIG. 3A is a cross-sectional view illustrating the tactile switch of FIG. 1A in a non-actuated state.

The first and second fixed open circuit output contacts 26*a*, 26*b* may be generally planar strips or plates of electrically conductive material that are mechanically and electrically connected to the first and second open circuit output contact terminals 38*a*, 38*b*, respectively, such as via crimping, welding, soldering, etc. The first and second fixed open circuit output contacts 26*a*, 26*b* may include respective first and second tongues or pads 46*a*, 46*b* that extend over, and are in mechanical and electrical contact with (though not affixed to), the first and second free ends 42*a*, 42*b* of the first and second movable input contacts 24*a*, 24*b*, respectively. The first and second pads 46*a*, 46*b* may impinge on the first and second free ends 42*a*, 42*b* of the first and second movable input contacts 24*a*, 24*b*, respectively, and may exert a downwardly directed force thereon, causing the first and second movable input contacts 24*a*, 24*b* to bend slightly in a downward direction (see FIG. 3A). The first and second movable input contacts 24*a*, 24*b* may be formed of a metal having a spring constant that causes the first and second free ends 42*a*, 42*b* to be biased upwardly, against the impinging first and second pads 46*a*, 46*b*. Thus, when the switch is in a non-actuated state (as shown in FIG. 3A and as further described below), the first and second free ends 42*a*, 42*b* are held in firm engagement with the first and second pads 46*a*, 46*b*, respectively, providing robust electrical connections therebetween.

When the tactile switch 10 is connected within a circuit, the first and second input conductors 18*a*, 18*b* may be connected to an electrical power source 47, such as a battery or other power supply. The first and second open circuit output conductors 20*a*, 20*b* may be connected to an open circuit indicator 49, such as a light emitting diode or other device or circuit adapted to indicate a state of the tactile switch 10 to a user. The first and second closed circuit output conductors 22*a*, 22*b* may be connected to a load 51 that is intended to be activated when the tactile switch 10 is actuated as further described below.

Still referring to FIG. 2 and also referring to FIG. 1C, the bascule element 12 may include a cantilevered portion 48 that may be disposed over the first and second movable input contacts 24*a*, 24*b* and may be pivotably connected to the housing 11 by first and second trunnions 50*a*, 50*b* extending from opposite sides of the cantilevered portion 48. In various embodiments, the first and second trunnions 50*a*, 50*b* may be disposed within respective first and second slots or grooves 52*a*, 52*b* formed in the housing 11 for restricting horizontal/lateral movement of the bascule element 12 while allowing the bascule element 12 to pivot freely about a common axis of the first and second trunnions 50*a*, 50*b* between an up position, shown in FIG. 3A, and a down position, shown in FIG. 3B (further described below). The present disclosure is not limited in this regard, and numerous alternative means of pivotably mounting the bascule element 12 within the housing 11 will be apparent to those of skill in the art and may be implemented without departing from the scope of the present disclosure. The bascule element 12 may be formed of any suitably rigid, dielectric material, such as plastic.

Referring to FIG. 1C, the tactile dome 13 may be a generally semispherical member having a domed central portion 56 with four legs 58 extending downwardly from edges thereof (e.g., from four "corners" of the central portion 56), to provide the tactile dome 13 with a four-pointed star shape when viewed from above. The four legs 58 may be seated atop respective, complementary shelves or shoulders 60 formed at the four corners of the internal cavity 30 of the housing 11, with the central portion 56 of the tactile dome 13 extending over the bascule element 12 (as best shown in FIG. 3A). The tactile dome 13 may be formed of a material having a spring constant selected to allow the tactile dome 13 to be manually deflected (i.e., deflected when subjected to moderate manual force) from its normal, convex state (i.e., presenting a convex surface to the flexible actuator 14), shown in FIGS. 1C and 3A, to a concave state (i.e., presenting a concave surface to the flexible actuator 14), shown in FIG. 3B, and to automatically return to the convex state when the manual force is removed (as further described below). In various embodiments the tactile dome 13 may be formed of stainless steel. The present disclosure is not limited in this regard.

Referring to FIGS. 1A and 1C, the flexible actuator 14 may be disposed atop the housing 11 and may cover the internal cavity 30 of the housing 11. The flexible actuator 14 may have a length and a width that are equal to, or similar to, those of the housing 11 such that the edges of the flexible actuator 14 are generally flush with the sides of the housing 11. The present disclosure is not limited in this regard. The flexible actuator 14 may include an upwardly extending button 62 adapted to be manually engaged by a user, and a plunger 64 (see FIG. 3A) extending downwardly from an underside of the button 62. A bottom surface of the plunger 64 may be suspended directly above, and may, in some embodiments, rest on, the central portion 56 of the tactile dome 13. The flexible actuator 14 may be formed of a material that is suitably flexible and elastic to allow the button 62 to be manually depressed (i.e., pushed downwardly when subjected to moderate manual force) and to automatically return to its undepressed position when the manual force is removed. In various embodiments the flexible actuator 14 may be formed of materials such as silicon, rubber, etc. The present disclosure is not limited in this regard.

Referring to FIGS. 1A and 1B, the fastening frame 16 of the tactile switch 10 may include a generally planar central portion 70 disposed atop the flexible actuator 14. The central portion 70 may have an aperture 72 formed therein for allowing the button 62 of the of the flexible actuator 14 to extend therethrough. The fastening frame 16 may further include a plurality of retaining tabs 76*a-d* extending from edges thereof. The retaining tabs 76*a-d* may be crimped, bent, folded, etc. downwardly into engagement with one or both of the flexible actuator 14 and the housing 11 in a manner that secures the fastening frame 16, the flexible actuator 14, and the housing 11 together in a vertically stacked arrangement and that restricts lateral/horizontal movement of the aforementioned components relative to one another. For example, as shown in FIGS. 1A and 1B, the fastening frame 16 may be square in shape, with the retaining tabs 76*a, c* extending from two opposing sides of the central portion 70 and defining respective apertures 78, 80 that fit over respective detents 82, 84 extending from the housing 11, thus securing the components of the tactile switch 10 together in a vertically stacked arrangement. Non-apertured retaining tabs 76*b*, 76*d* may extend from the other two opposing sides of the central portion 70 and may engage the sides of the flexible actuator 14 and the housing 11. The present disclosure is not limited in this regard, and numerous other configurations and arrangements for securing the components of the tactile switch 10 together in a stacked arrangement are contemplated and may be implemented without departing from the scope of the present disclosure. The fastening frame 16 may be formed of a metal such as stainless steel, aluminum, etc.

Referring to FIG. 3A, a cross-sectional view illustrating the tactile switch 10 in a non-actuated state, wherein the button 62 of the flexible actuator 14 is not depressed, is shown. In this state, the tactile dome 13 may be in its convex state, the bascule element 12 may be in its up position, and the first and second free ends 42*a*, 42*b* of the first and second movable input contacts 24*a*, 24*b* may be in contact with the first and second pads 46*a*, 46*b* of the first and second fixed open circuit output contacts 26*a*, 26*b*, respectively (the first movable input contact 24*a* and the first open circuit output contact 26*a* are not within view in FIG. 3A, see FIG. 2). Thus, electrical current may flow from the electrical power source 47, to the first and second input conductors 18*a*, 18*b* (the first input conductor 18*a* is not within view in FIG. 3A, see FIG. 2), to the first and second movable input contacts 24*a*, 24*b*, to the first and second fixed open circuit output contacts 26*a*, 26*b* (the first fixed open circuit output contact 26*a* is not within view in FIG. 3A, see FIG. 2), to the first and second open circuit output contact terminals 38*a*, 38*b* (not within view in FIG. 3A, see FIG. 2), to the first and second open circuit output conductors 20*a*, 20*b* (not within view in FIG. 3A, see FIG. 2), to the open circuit indicator 49. The open circuit indicator 49 (e.g., a light emitting diode) thereby receives electrical power from electrical power source 47 and may emit a visible light or otherwise provide a user with a perceivable, positive indication that the tactile switch 10 is in a non-actuated state.

Figure 3B:
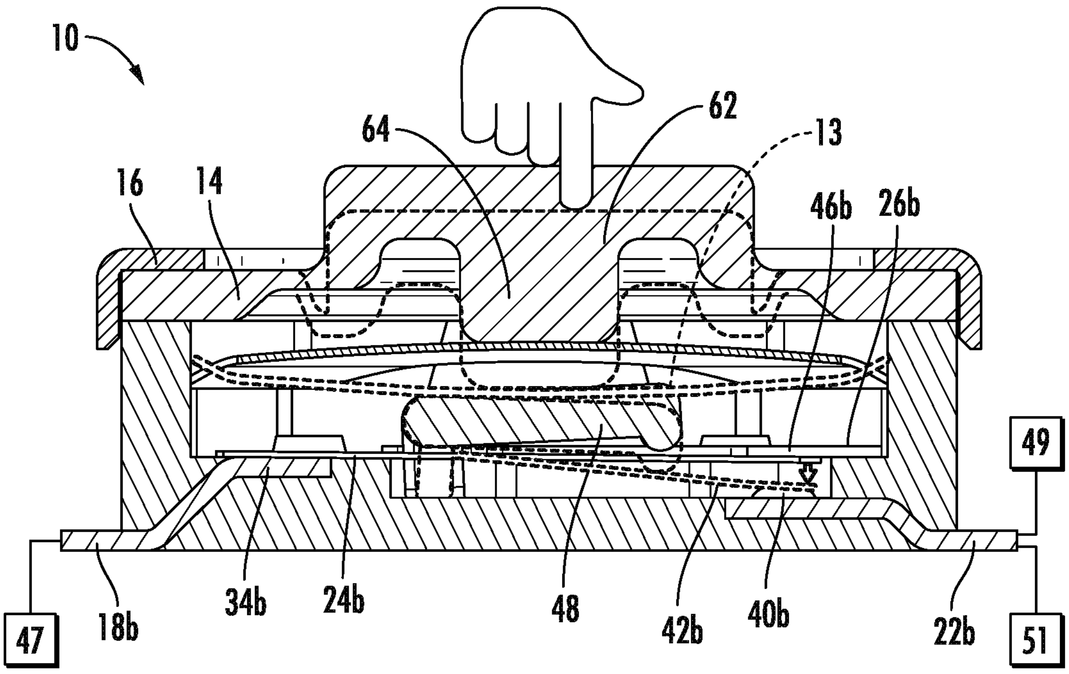
FIG. 3B is a cross-sectional view illustrating the tactile switch of FIG. 1A in an actuated state.

Referring to FIG. 3B, a cross-sectional view illustrating the tactile switch 10 in an actuated state, wherein the button 62 of the flexible actuator 14 is being depressed, is shown. In this state, the plunger 64 of the flexible actuator 14 may forcibly deflect the tactile dome 13 into its concave state, the bottom surface of the deflected tactile dome 13 may push the bascule element 12 downwardly to its down position, and the bascule element 12 may forcibly deflect the first and second free ends 42*a*, 42*b* of the first and second movable input contacts 24*a*, 24*b* downwardly, into contact with the first and second closed circuit output contact terminals 40*a*, 40*b* of the first and second closed circuit output conductors 22*a*, 22*b*, respectively (the first closed circuit output contact terminal 40*a* and the first closed circuit output conductor 22*a* are not within view in FIG. 3B, see FIG. 2). Thus, electrical current may flow from the electrical power source 47, to the first and second input conductors 18*a*, 18*b* (the first input conductor 18*a* is not within view in FIG. 3B, see FIG. 2), to the first and second movable input contacts 24*a*, 24*b*, to the first and second closed circuit output conductors 22*a*, 22*b*, to the load 51. The load 51 thereby receives electrical power from electrical power source 47 and may be activated/powered. Also, when the tactile switch 10 is in the non-actuated state, the open circuit indicator 49 is disconnected from the electrical power source 47 and is deactivated, thereby providing a user with an additional, perceivable indication (i.e., in addition to activation/powering of the load 51) that the tactile switch 10 is in an actuated state.

When the button 62 of the flexible actuator 14 is released by a user, the tactile dome 13 may be allowed to deflect back to its convex state, thus removing the downward force exerted on the bascule element 12 and allowing the first and second free ends 42*a*, 42*b* of the first and second movable input contacts 24*a*, 24*b* to move upwardly into contact with the first and second pads 46*a*, 46*b* of the first and second fixed open circuit output contacts 26*a*, 26*b*, respectively, thereby reestablishing the non-actuated state of the tactile switch 10 shown in FIG. 3A.

Figure 4A:
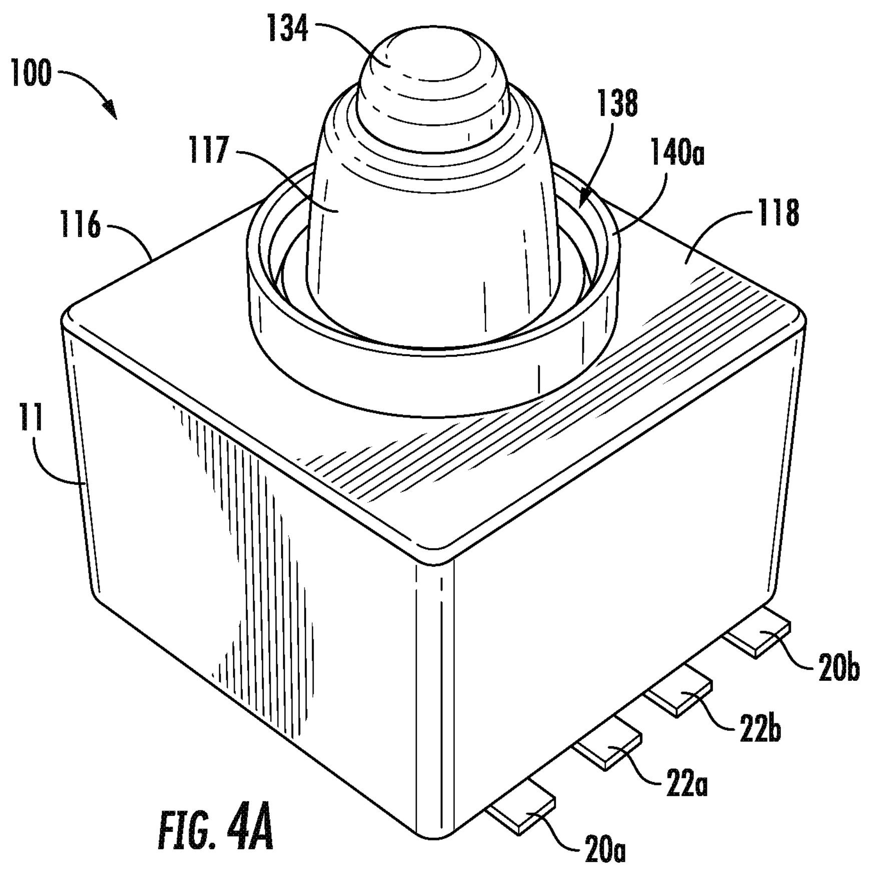
FIG. 4A is a top perspective view illustrating a snap switch in accordance with another embodiment of the present disclosure.
Figure 4B:
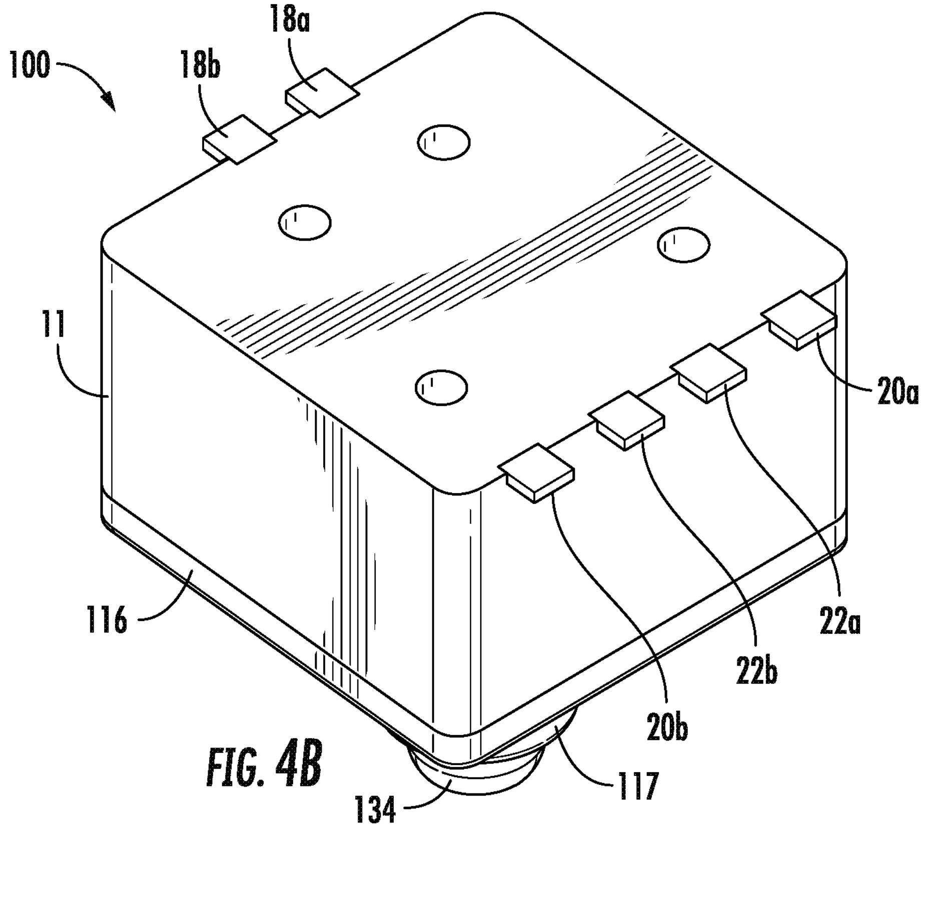
FIG. 4B is a bottom perspective view illustrating the snap switch of FIG. 4A.
Figure 4C:
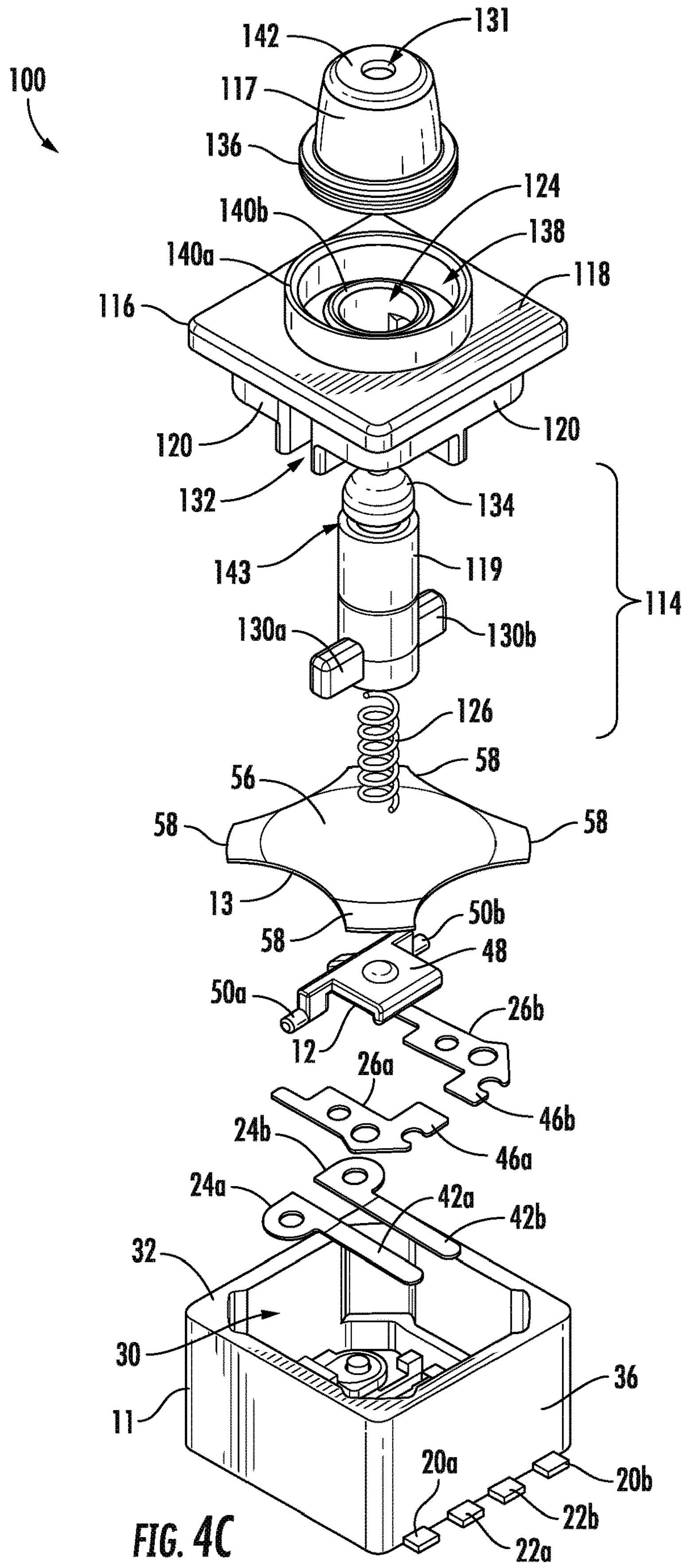
FIG. 4C is an exploded view illustrating the snap switch of FIG. 4A.

Referring to FIGS. 4A-4C, a top perspective view, a bottom perspective view, and an exploded view illustrating a DPDT snap switch 100 (hereinafter "the snap switch 100") in accordance with an embodiment of the present disclosure are provided, respectively. For the sake of convenience and clarity, terms such as "top," "bottom," "up," "down," "upper," "lower," "above," "below," "vertical," and "horizontal," and the like may be used herein to describe the relative positions and orientations of various components of the snap switch 100, all with respect to the geometry and orientation of the snap switch 100 as it appears in FIGS. 4A-4C. Said terminology will include the words specifically mentioned, derivatives thereof, and words of similar import.

The snap switch 100 may be generally similar to the tactile switch 10 described above, and may similarly include a housing 11, a bascule element 12, a tactile dome 13, and various current carrying elements disposed at least partially within the housing 11. The housing 11, bascule element 12, tactile dome 13, and current carrying elements of the snap switch 100 may be generally identical to those of the tactile switch 10 described above. The descriptions of these components provided above in the context of the tactile switch 10, including the depiction of the current carrying elements provided in FIG. 2, shall therefore also apply in the context of the snap switch 100. Accordingly, the reference numerals used to identify the aforementioned components in the context of the tactile switch 10 shall also be used in the context of the snap switch 100.

Unlike the tactile switch 10, the snap switch 100 does not include a flexible actuator or a fastening frame. Instead, the snap switch 100 incudes a spring-loaded actuator 114, a housing cover 116, and a sealing boot 117. The housing cover 116 may include a generally planar cap portion 118 disposed atop the housing 11, enclosing the internal cavity 30 of the housing 11. The cap portion 118 may have a length and a width that are equal or similar to those of the housing 11 such that the edges of the cap portion 118 are generally flush with the sides of the housing 11. The present disclosure is not limited in this regard. The cap portion 118 may be fastened to the housing 11 in a manner that provides a fluid-tight seal therebetween, e.g., via laser welding, adhesives, mechanical fastener and gasket arrangements, etc. Various alignment features, such as laterally/horizontally recessed walls or flanges 120, may extend from a bottom surface of the cap portion 118 for extending into the internal cavity 30 of the housing 11 and engaging interior surfaces of the housing 11 to assist with proper alignment of the housing cover 116 relative to the housing 11 during assembly of the snap switch 100.

Figure 5B:
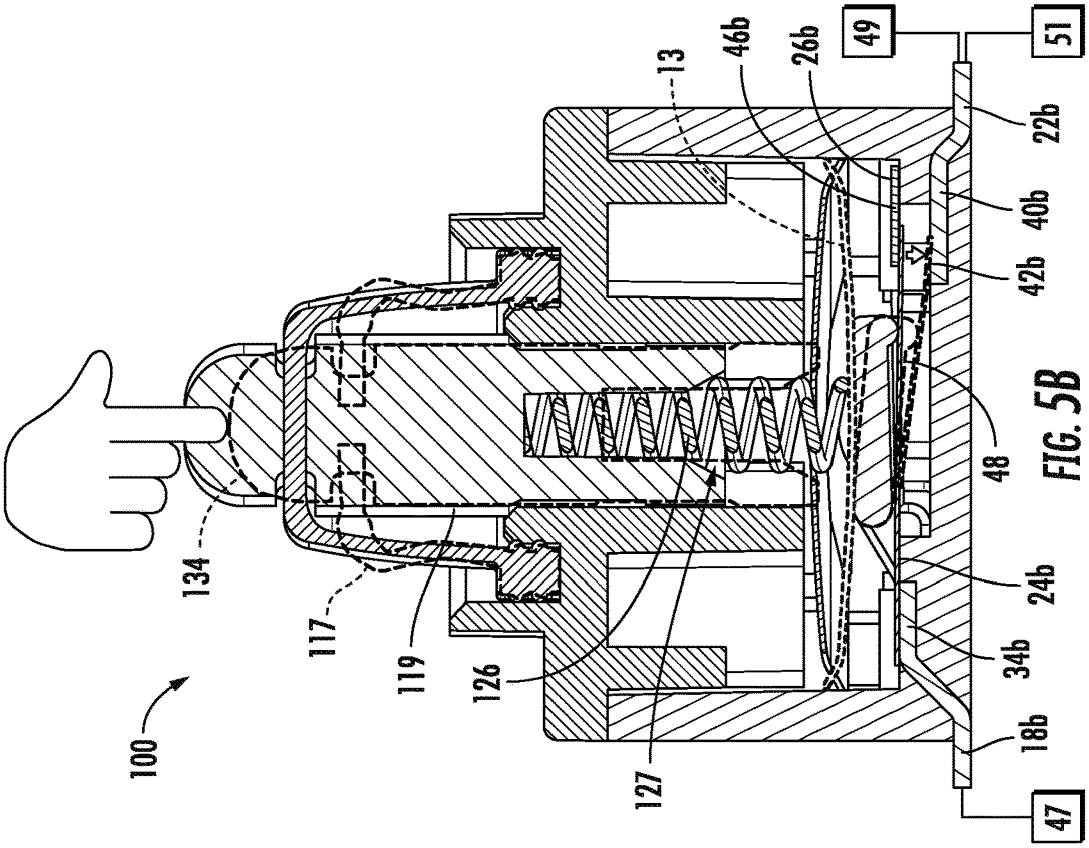
FIG. 5B is a cross-sectional view illustrating the snap switch of FIG. 4A in an actuated state.
Figure 5A:
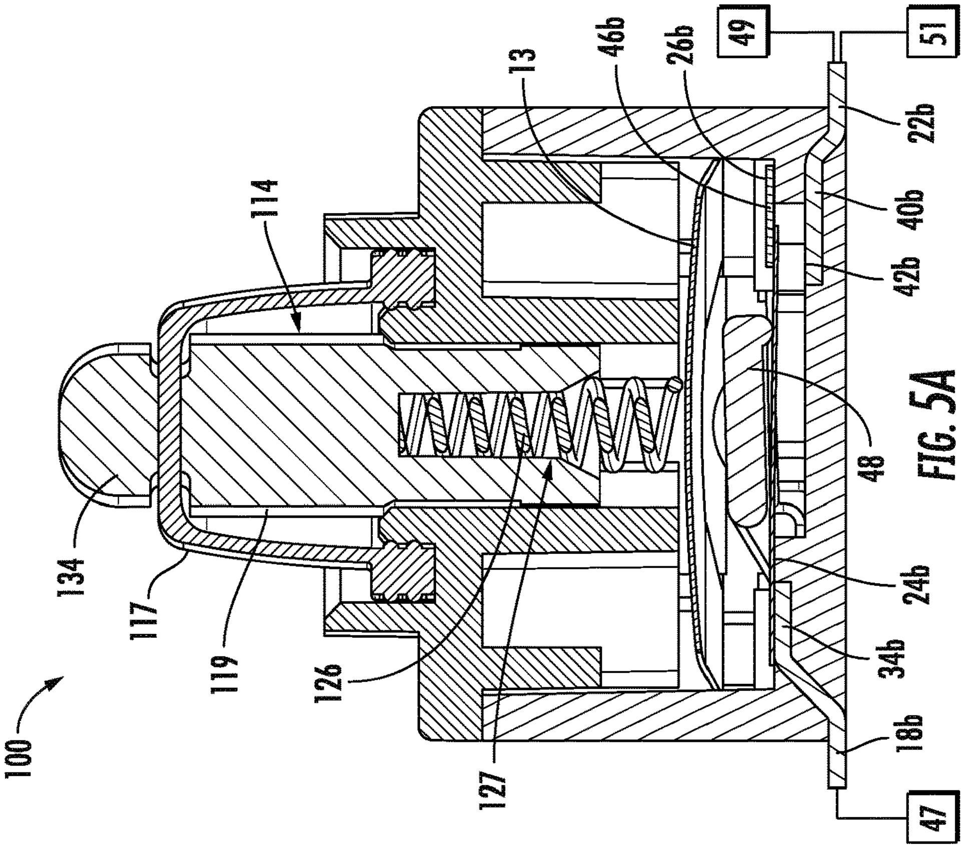
FIG. 5A is a cross-sectional view illustrating the snap switch of FIG. 4A in a non-actuated state.

Referring to FIG. 4C, and also referring to the cross-sectional view of the snap switch 100 shown in FIG. 5A, the spring-loaded actuator 114 may be disposed atop the tactile dome 13 and may include a vertically oriented, generally cylindrical plunger 119 that extends through an aperture 124 in the cap portion 118 of the housing cover 116. The spring-loaded actuator 114 may further include a coil spring 126 that sits atop the tactile dome 13 and axially extends into a cavity 127 formed in a bottom of the plunger 119. The coil spring 126 may be taller than a depth of the cavity 127 when the coil spring 126 is in an uncompressed or partially compressed state and may hold the plunger 119 a distance above the top surface of the tactile dome 13 when the switch 100 is in a non-actuated state as further described below. The plunger 119 may include first and second flanges 130*a*, 130*b* extending horizontally therefrom into a corresponding channel 132 formed in a bottom of the cap portion 118 of the housing cover 116. The channel 132 may restrict horizontal movement of the first and second flanges 130*a*, 130*b* to prevent the plunger 119 from being displaced horizontally/laterally while allowing the plunger to 118 to move vertically.

The sealing boot 117 may be a flexible, generally thimble-shaped member disposed atop the housing cover 116, over the plunger 119, with a tip of the plunger 119 extending through an aperture 131 in the top of the sealing boot 117 and defining a button 134 above the sealing boot 117. An annular base 136 of the sealing boot 117 may be seated in a complementary, annular groove 138 defined by the housing cover 116 and surrounding the aperture 124 in the housing cover 116. The annular groove 138 may be defined by a pair of concentric, annular walls 140*a*, 140*b* extending from a top surface of the housing cover 116, for example. A top of the sealing boot 117 may define an annular collar 142 that extends radially into an annular recess 143 formed in the plunger 119 below the button 134. The sealing boot 117 may be formed of any suitably flexible, elastic material that allows the plunger 119 to move vertically between an extended position (see FIG. 5A) and a depressed position (see FIG. 5B) while maintaining a seal between the plunger 119 and the housing cover 116 to prevent or mitigate the entry of external contaminants (e.g., dust, water, other particulate and/or fluid) into the housing 11. Such materials include, but are not limited to, silicon, rubber, and the like.

Referring to FIG. 5A, a cross-sectional view illustrating the snap switch 100 in a non-actuated state, wherein the plunger 119 of the spring-loaded actuator 114 is not depressed, is shown. In this state, the tactile dome 13 may be in its convex state, the bascule element 12 may be in its up position, and the first and second free ends 42*a*, 42*b* of the first and second movable input contacts 24*a*, 24*b* may be in contact with the first and second pads 46*a*, 46*b* of the first and second fixed open circuit output contacts 26*a*, 26*b* (the first movable input contact 24*a* and the first open circuit output contact 26*a* are not within view in FIG. 5A, see FIG. 2). Thus, electrical current may flow from the electrical power source 47, to the first and second input conductors 18*a*, 18*b* (the first input conductor 18*a* is not within view in FIG. 5A, see FIG. 2), to the first and second movable input contacts 24*a*, 24*b*, to the first and second fixed open circuit output contacts 26*a*, 26*b* (the first fixed open circuit output contact 26*a* is not within view in FIG. 5A, see FIG. 2), to the first and second open circuit output contact terminals 38*a*, 38*b* (not within view in FIG. 3A, see FIG. 2), to the first and second open circuit output conductors 20*a*, 20*b* (not within view in FIG. 5A, see FIG. 2), to the open circuit indicator 49. The open circuit indicator 49 (e.g., a light emitting diode) thereby receives electrical power from electrical power source 47 and may emit a visible light or otherwise provide a user with a perceivable, positive indication that the snap switch 100 is in a non-actuated state.

Referring to FIG. 5B, a cross-sectional view illustrating the tactile switch 10 in an actuated state, wherein the button 134 of the spring-loaded actuator 114 is being depressed, is shown. In this state, the plunger 119 of the spring-loaded actuator 114 has been depressed (via manual force exerted on the button 134), causing the coil spring 126 to be compressed between the plunger 119 and the tactile dome 13 to a point where a downwardly directed spring force exerted by the coil spring 126 on the tactile dome 13 is sufficient to overcome an upwardly directed spring force exerted by the tactile dome 13. Thus, the tactile dome 13 is forcibly deflected into its concave state, the bottom surface of the deflected tactile dome 13 pushes the bascule element 12 downwardly to its down position, and the bascule element 12 forcibly deflects the first and second free ends 42*a*, 42*b* of the first and second movable input contacts 24*a*, 24*b* downwardly, into contact with the first and second closed circuit output contact terminals 40*a*, 40*b* of the first and second closed circuit output conductors 22*a*, 22*b*, respectively (the first closed circuit output contact terminal 40*a* and the first closed circuit output conductor 22*a* are not within view in FIG. 5B, see FIG. 2). Thus, electrical current may flow from the electrical power source 47, to the first and second input conductors 18*a*, 18*b* (the first input conductor 18*a* is not within view in FIG. 5B, see FIG. 2), to the first and second movable input contacts 24*a*, 24*b*, to the first and second closed circuit output conductors 22*a*, 22*b*, to the load

51. The load 51 thereby receives electrical power from electrical power source 47 and may be activated/powered. Also, when the tactile switch 10 is in the non-actuated state, the open circuit indicator 49 is disconnected from the electrical power source 47 and is deactivated, thereby providing a user with an additional, perceivable indication (i.e., in addition to activation/powering of the load 51) that the tactile switch 10 is in an actuated state.

When the button 134 of the spring-loaded actuator 114 is released by a user, the downwardly directed spring force exerted on the tactile dome 13 by the coil spring 126 may be released/reduced until it is no longer sufficient to overcome the opposing, upwardly directed spring force exerted by the tactile dome 13. Thus, the tactile dome 13 may be allowed to deflect back to its convex state, removing the downward force exerted on the bascule element 12, and allowing the first and second free ends 42*a*, 42*b* of the first and second movable input contacts 24*a*, 24*b* to move upwardly into contact with the first and second pads 46*a*, 46*b* of the first and second fixed open circuit output contacts 26*a*, 26*b*, respectively, thereby reestablishing the non-actuated state of the snap switch 100 shown in FIG. 5A.

Figure 6:
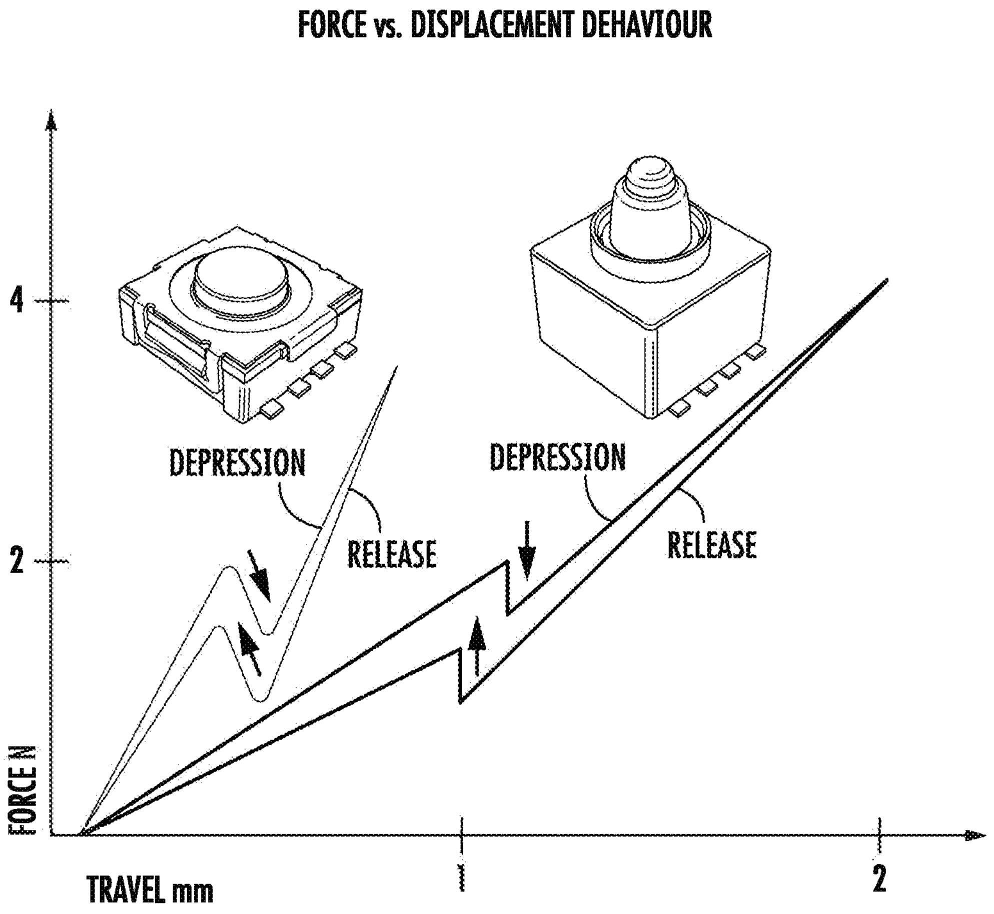
FIG. 6 is a graph illustrating force vs. displacement behavior for the button of the tactile switch shown in FIG. 1A and the button of the snap switch shown in FIG. 4A.

Owning to the coil spring 126, the button 134 of the spring-loaded actuator 114 of the snap switch 100 may be depressed a distance of about 1 millimeter before the snap switch 100 changes from its non-actuated state to its actuated state (i.e., before the downwardly directed spring force exerted by the coil spring 126 is sufficient to overcome the upwardly directed spring force exerted by the tactile dome 13). After actuation occurs, the button 134 may be depressed an additional distance of about 1 millimeter before it is fully depressed. When the button 134 is released, the button 134 may be allowed to move upwardly (under force of the coil spring 126) a distance of about 1 millimeter before the snap switch 100 changes from its actuated state back to its non-actuated state (i.e., before the downwardly directed spring force exerted by the coil spring 126 is reduced until it is no longer sufficient to overcome the upwardly directed spring force exerted by the tactile dome 13), and may continue to move upwardly an additional distance of about 1 millimeter before it is fully extended. The spring-loaded actuator 114 of the snap switch 100 therefore exhibits significant movement before and after the snap switch 100 transitions from its non-actuated state to its actuated state, and before and after the snap switch 100 transitions from its actuated state back to its non-actuated state. This is to be contrasted with the above-described tactile switch 10, wherein vertical movement of the flexible actuator 14 results in an equal or nearly equal vertical movement (deflection) of the tactile dome 13. Accordingly, the deflection of the tactile dome 13 in the tactile switch 10 is more susceptible to fine, manual manipulation by a user relative to the deflection of the tactile dome 13 in the snap switch 100 where the effect of the movement of the spring-loaded actuator 114 on the tactile dome 13 is buffered by the coil spring 126. This behavior is exhibited in the graph shown in FIG. 6, which illustrates the relationship between force exerted on the buttons 62, 134 of the tactile switch 10 and the snap switch 100 vs. the distance travelled by the buttons 62, 134 during depression and release of the buttons 62, 134. As shown, the snap switch 100 exhibits sharper actuation and sharper release relative to the tactile switch 10.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A double pole double throw (DPDT) switch comprising:

a housing defining an internal cavity;

first and second input conductors extending through a first sidewall of the housing and terminating in respective first and second input contact terminals within the internal cavity;

first and second open circuit output conductors extending through a second sidewall of the housing and terminating in respective first and second open circuit output contact terminals within the internal cavity;

first and second closed circuit output conductors extending through the second sidewall and terminating in respective first and second closed circuit output contact terminals within the internal cavity;

first and second movable input contacts connected to the first and second input contact terminals, respectively, extending through the internal cavity and terminating in respective first and second free ends disposed over the first and second closed circuit output contact terminals;

first and second fixed open circuit output contacts connected to the first and second open circuit output contact terminals, respectively, and defining respective first and second pads that extend over the first and second free ends of the first and second movable input contacts, respectively;

a bascule element pivotably mounted within the internal cavity and having a cantilevered portion extending over the first and second free ends of the first and second movable input contacts;

a tactile dome disposed within the internal cavity and extending over the bascule element; and an actuator disposed atop the housing and over the tactile dome and adapted to be engaged by a user;

wherein, when the actuator is not engaged and the DPDT switch is in a non-actuated state, the first and second free ends of the first and second movable input contacts are in contact with the first and second pads of the first and second fixed open circuit output contacts, respectively, creating a path for electrical current to flow from the first and second input conductors to the first and second open circuit output conductors; and wherein, when the actuator is engaged and the DPDT switch is in an actuated state, the actuator presses on the tactile dome, causing the tactile dome to deflect and press on the bascule element, causing the bascule element to press on the first and second free ends of the first and second movable input contacts, moving the first and second free ends out of contact with the first and second pads of the first and second fixed open circuit output contacts and into contact with the first and second closed circuit output contact terminals, respectively, creating a path for electrical current to flow from the first and second input conductors to the first and second closed circuit output conductors.

2. The DPDT switch of claim 1, wherein the bascule element is formed of a dielectric material.

3. The DPDT switch of claim 1, wherein the tactile dome has a domed central portion with a plurality of legs extending from edges of the central portion, wherein the legs are disposed on respective shoulders of the housing within the internal cavity, wherein the tactile dome can be deflected from a normal, convex state, wherein the tactile dome presents a convex surface to the actuator, and a concave state, wherein the tactile dome presents a concave surface to the actuator.

4. The DPDT switch of claim 3, wherein the tactile dome is formed of stainless steel.

5. The DPDT switch of claim 1, wherein the actuator is a flexible actuator formed of an elastic material and comprises an upwardly extending button adapted to be manually engaged by a user, and a plunger extending downwardly from an underside of the button, wherein a bottom surface of the plunger is disposed directly above the tactile dome, wherein the button is adapted to be depressed in response to application of a manual force and to automatically return to an undepressed position when the manual force is removed.

6. The DPDT switch of claim 5, wherein the flexible actuator is formed of one of silicon and rubber.

7. The DPDT switch of claim 5, further comprising a fastening frame comprising:
- a central portion disposed atop the flexible actuator, the central portion having an aperture formed therein for allowing the button flexible actuator to extend therethrough; and
- a plurality of retaining tabs extending from edges of the central portion, wherein the retaining tabs engage at least one of the flexible actuator and the housing to secure the fastening frame, the flexible actuator, and the housing together in a stacked arrangement.

8. The DPDT switch of claim 1, wherein the actuator is a spring-loaded actuator comprising:
- a plunger located above the tactile dome; and
- a coil spring disposed atop the tactile dome and extending into a cavity formed in a bottom of the plunger;
- wherein the DPDT switch further comprises:
  - a housing cap disposed atop the housing and having an aperture through which the plunger extends; and
  - a sealing boot disposed atop the housing cover, over the plunger, with a tip of the plunger extending through an aperture in a top of the sealing boot and defining a button adapted to be manually engaged by a user.

9. The DPDT switch of claim 8, wherein the sealing boot has an annular base disposed within a complementary, annular groove formed in a top of the housing cover.

10. The DPDT switch of claim 8, wherein a top of the sealing boot defines an annular collar that extends into an annular recess formed in the plunger.

11. A double pole double throw (DPDT) tactile switch comprising:
- a housing defining an internal cavity;
- first and second input conductors extending through a first sidewall of the housing and terminating in respective first and second input contact terminals within the internal cavity;
- first and second open circuit output conductors extending through a second sidewall of the housing and terminating in respective first and second open circuit output contact terminals within the internal cavity;
- first and second closed circuit output conductors extending through the second sidewall and terminating in respective first and second closed circuit output contact terminals within the internal cavity;
- first and second movable input contacts connected to the first and second input contact terminals, respectively, extending through the internal cavity and terminating in respective first and second free ends disposed over the first and second closed circuit output contact terminals;
- first and second fixed open circuit output contacts connected to the first and second open circuit output contact terminals, respectively, and defining respective first and second pads that extend over the first and second free ends of the first and second movable input contacts, respectively;
- a bascule element pivotably mounted within the internal cavity and having a cantilevered portion extending over the first and second free ends of the first and second movable input contacts;
- a tactile dome disposed within the internal cavity and extending over the bascule element; and
- a flexible actuator disposed atop the housing and over the tactile dome, wherein the flexible actuator is formed of an elastic material and comprises an upwardly extending button adapted to be manually engaged by a user, and a plunger extending downwardly from an underside of the button, wherein a bottom surface of the plunger is disposed directly above the tactile dome, wherein the button is adapted to be depressed in response to application of a manual force and to automatically return to an undepressed position when the manual force is removed;
- wherein, when the button is not depressed and the DPDT tactile switch is in a non-actuated state, the first and second free ends of the first and second movable input contacts are in contact with the first and second pads of the first and second fixed open circuit output contacts, respectively, creating a path for electrical current to flow from the first and second input conductors to the first and second open circuit output conductors; and
- wherein, when the button is depressed and the DPDT tactile switch is in an actuated state, the plunger of the flexible actuator presses on the tactile dome, causing the tactile dome to deflect and press on the bascule element, causing the bascule element to press on the first and second free ends of the first and second movable input contacts, moving the first and second free ends out of contact with the first and second pads of the first and second fixed open circuit output contacts and into contact with the first and second closed circuit output contact terminals, respectively, creating a path for electrical current to flow from the first and second input conductors to the first and second closed circuit output conductors.

12. The DPDT tactile switch of claim 11, wherein the tactile dome has a domed central portion with a plurality of legs extending from edges of the central portion, wherein the legs are disposed on respective shoulders of the housing within the internal cavity, wherein the tactile dome can be deflected from a normal, convex state, wherein the tactile dome presents a convex surface to the actuator, and a concave state, wherein the tactile dome presents a concave surface to the actuator.

13. The DPDT tactile switch of claim 11, wherein the tactile dome is formed of stainless steel.

14. The DPDT tactile switch of claim 11, further comprising a fastening frame comprising:

a central portion disposed atop the flexible actuator, the central portion having an aperture formed therein for allowing the button flexible actuator to extend therethrough; and a plurality of retaining tabs extending from edges of the central portion, wherein the retaining tabs engage at least one of the flexible actuator and the housing to secure the fastening frame, the flexible actuator, and the housing together in a stacked arrangement.

15. The DPDT tactile switch of claim 11, wherein the bascule element is formed of a dielectric material.

16. A double pole double throw (DPDT) snap switch comprising:

a housing defining an internal cavity;

first and second input conductors extending through a first sidewall of the housing and terminating in respective first and second input contact terminals within the internal cavity;

first and second open circuit output conductors extending through a second sidewall of the housing and terminating in respective first and second open circuit output contact terminals within the internal cavity;

first and second closed circuit output conductors extending through the second sidewall and terminating in respective first and second closed circuit output contact terminals within the internal cavity;

first and second movable input contacts connected to the first and second input contact terminals, respectively, extending through the internal cavity and terminating in respective first and second free ends disposed over the first and second closed circuit output contact terminals;

first and second fixed open circuit output contacts connected to the first and second open circuit output contact terminals, respectively, and defining respective first and second pads that extend over the first and second free ends of the first and second movable input contacts, respectively;

a bascule element pivotably mounted within the internal cavity and having a cantilevered portion extending over the first and second free ends of the first and second movable input contacts;

a tactile dome disposed within the internal cavity and extending over the bascule element;

a spring-loaded actuator disposed atop the housing and over the tactile dome, the spring-loaded actuator comprising:

a plunger located above the tactile dome; and a coil spring disposed atop the tactile dome and extending into a cavity formed in a bottom of the plunger;

a housing cap disposed atop the housing and having an aperture through which the plunger extends; and a sealing boot disposed atop the housing cover, over the plunger, with a tip of the plunger extending through an aperture in a top of the sealing boot and defining a button adapted to be manually engaged by a user;

wherein, when the button is not engaged and the DPDT snap switch is in a non-actuated state, the first and second free ends of the first and second movable input contacts are in contact with the first and second pads of the first and second fixed open circuit output contacts, respectively, creating a path for electrical current to flow from the first and second input conductors to the first and second open circuit output conductors; and wherein, when the button is engaged and the DPDT snap switch is in an actuated state, the coil spring of the spring-loaded actuator is compressed between the plunger and the tactile dome, causing the tactile dome to deflect and press on the bascule element, causing the bascule element to press on the first and second free ends of the first and second movable input contacts, moving the first and second free ends out of contact with the first and second pads of the first and second fixed open circuit output contacts and into contact with the first and second closed circuit output contact terminals, respectively, creating a path for electrical current to flow from the first and second input conductors to the first and second closed circuit output conductors.

17. The DPDT snap switch of claim 16, wherein the tactile dome has a domed central portion with a plurality of legs extending from edges of the central portion, wherein the legs are disposed on respective shoulders of the housing within the internal cavity, wherein the tactile dome can be deflected from a normal, convex state, wherein the tactile dome presents a convex surface to the spring loaded actuator, and a concave state, wherein the tactile dome presents a concave surface to the spring loaded actuator.

18. The DPDT snap switch of claim 16, wherein the bascule element is formed of a dielectric material.

19. The DPDT snap switch of claim 16, wherein the sealing boot has an annular base disposed within a complementary, annular groove formed in a top of the housing cover.

20. The DPDT snap switch of claim 16, wherein a top of the sealing boot defines an annular collar that extends into an annular recess formed in the plunger.

* * * * *